United States Patent [19]

Stockton

[11] 4,033,200
[45] July 5, 1977

[54] FIVE SPEED OVERDRIVE TRANSMISSION

[75] Inventor: Thomas R. Stockton, Ann Arbor, Mich.

[73] Assignee: Ford Motor Company, Dearborn, Mich.

[22] Filed: Apr. 24, 1975

[21] Appl. No.: 571,337

[52] U.S. Cl. .................. 74/740; 74/325; 74/359

[51] Int. Cl.² .................. F16H 37/00; F16H 3/08

[58] Field of Search ........... 74/359, 360, 332, 740, 74/325, 331; 192/41 R, 45; 180/70

[56] References Cited

UNITED STATES PATENTS

| | | | |
|---|---|---|---|
| 921,078 | 5/1909 | Brunhouse | 74/359 |
| 930,419 | 8/1909 | Schlig | 74/359 |
| 1,623,214 | 4/1927 | Storey | 74/359 X |
| 2,369,848 | 2/1945 | Patterson | 192/45 |
| 2,685,210 | 8/1954 | Heisler | 74/359 X |
| 2,694,939 | 11/1954 | Schmitter | 74/359 |
| 3,046,807 | 7/1962 | Barth | 74/331 |
| 3,126,752 | 3/1964 | Bolster | 74/331 |
| 3,301,079 | 1/1967 | Fletcher et al. | 74/360 X |
| 3,400,601 | 9/1968 | Ruhl et al. | 74/360 X |
| 3,645,153 | 2/1972 | Northcraft | 180/70 |

*Primary Examiner*—Samuel Scott
*Assistant Examiner*—Lance W. Chandler
*Attorney, Agent, or Firm*—Donald J. Harrington; Keith L. Zerschling

[57] ABSTRACT

A multiple ratio power transmission mechanism for a vehicle driveline comprising synchronized torque transmitting gears located on a pair of countershafts in parallel disposition with respect to a torque input shaft for establishing torque flow paths of differing speed ratios with minimum axial dimensions, the torque flow path through the fourth forward driving speed ratio including an overrunning clutch, and an overdrive ratio gear system with a fifth speed ratio synchronizer clutch means for establishing a mechanical torque delivery path around the overrunning clutch during overdrive operation, the countershafts being geared to a differential ring gear through which driving torque is delivered to oppositely disposed axle shafts.

4 Claims, 3 Drawing Figures

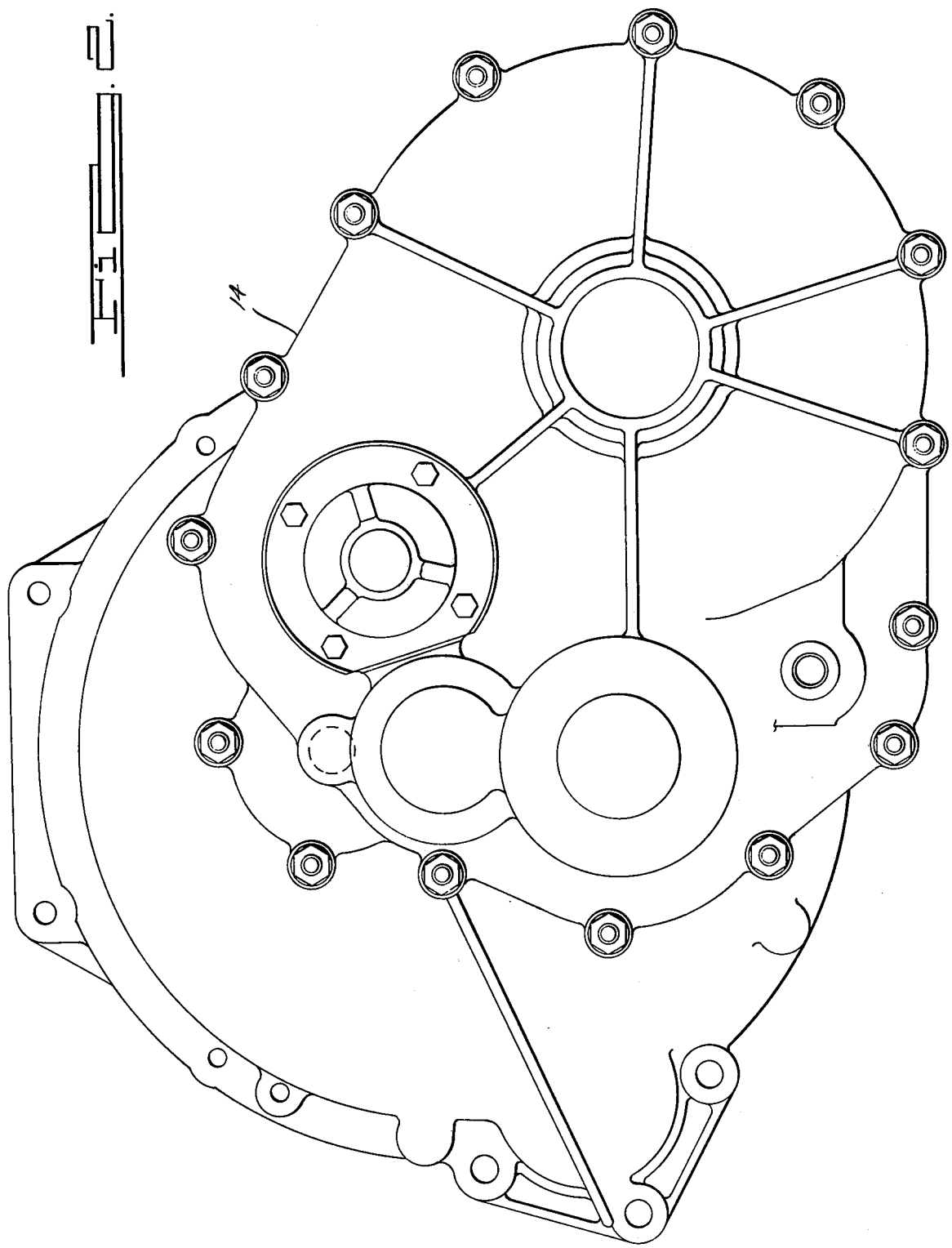

ered by the gear element 68. Synchronizer blocker rings 84 and 86 are situated adjacent the synchronizer clutch teeth 80 and 82, respectively. When the synchronizer clutch sleeve 72 is shifted in a right-hand direction as viewed in FIG. 1, internal clutch teeth formed in the sleeve 72 engage teeth 80 thereby locking the gear element 66 to the countershaft 54. When the sleeve 72 is shifted in a left-hand direction, as viewed in FIG. 1, internal clutch teeth formed in the
FIVE SPEED OVERDRIVE TRANSMISSION

GENERAL DESCRIPTION OF THE INVENTION

The improved transmission of my invention is adaptable for front wheel drive road vehicles although it may be used also in a vehicle driveline with the engine and speed-change gearing at the forward portion of the vehicle chassis and with the drive wheels in the rear. The gear system of my transmission uses two countershafts with cluster gear arrangements and synchronizer clutches situated in parallel relationship with respect to an intermediate power input shaft, thereby providing a minimum axial dimension in comparison to multiple speed transmissions of known construction having the same number of ratios and an equivalent torque capacity.

My improved transmission is characterized further by an overdrive gear which has the highest speed ratio. The overdrive gear may be clutched selectively with a synchronizer clutch to one of the countershafts to establish an overdrive condition. An overrunning clutch is located in the geartrain for the fourth gear ratio, and upon engaging the overdrive synchronizer clutch the overrunning clutch permits a pickup shift from the fourth ratio without the necessity for disengaging the fourth ratio synchronizer clutch. Provision may be made for operating the overdrive synchronizer clutch by means of a servo actuator as torque delivery is interrupted. Preferably torque interruption occurs by momentarily relaxing the vehicle accelerator throttle control for the engine. An automatic downshift occurs by interrupting the ignition for the engine thereby producing a torque interruption and by disengaging the overdrive synchronizer clutch. The overrunning clutch for the fourth speed ratio torque delivery path then engages automatically.

The torque flow path through the gearing during operation in the first and second speed ratios is established by the countershaft gears on one side of the axis of the input shaft, and the three higher speed ratio gears are located on the countershaft on the opposite side of the input shaft. This arrangement reduces the overall length of the transmission and adapts the transmission and driveline for small vehicle installations.

BRIEF DESCRIPTION OF THE FIGURES OF THE DRAWINGS

FIG. 2 is an end view of the transmission mechanism of FIG. 1.

PARTICULAR DESCRIPTION OF THE INVENTION

A transmission housing 10 is adapted to be bolted at its margin to the engine block of an internal combustion vehicle engine. A second transmission housing 14 is adapted to be bolted at its margin to the left-hand margin of the housing 10 and it forms with the housing 10 a unitary housing structure.

Figure 1:
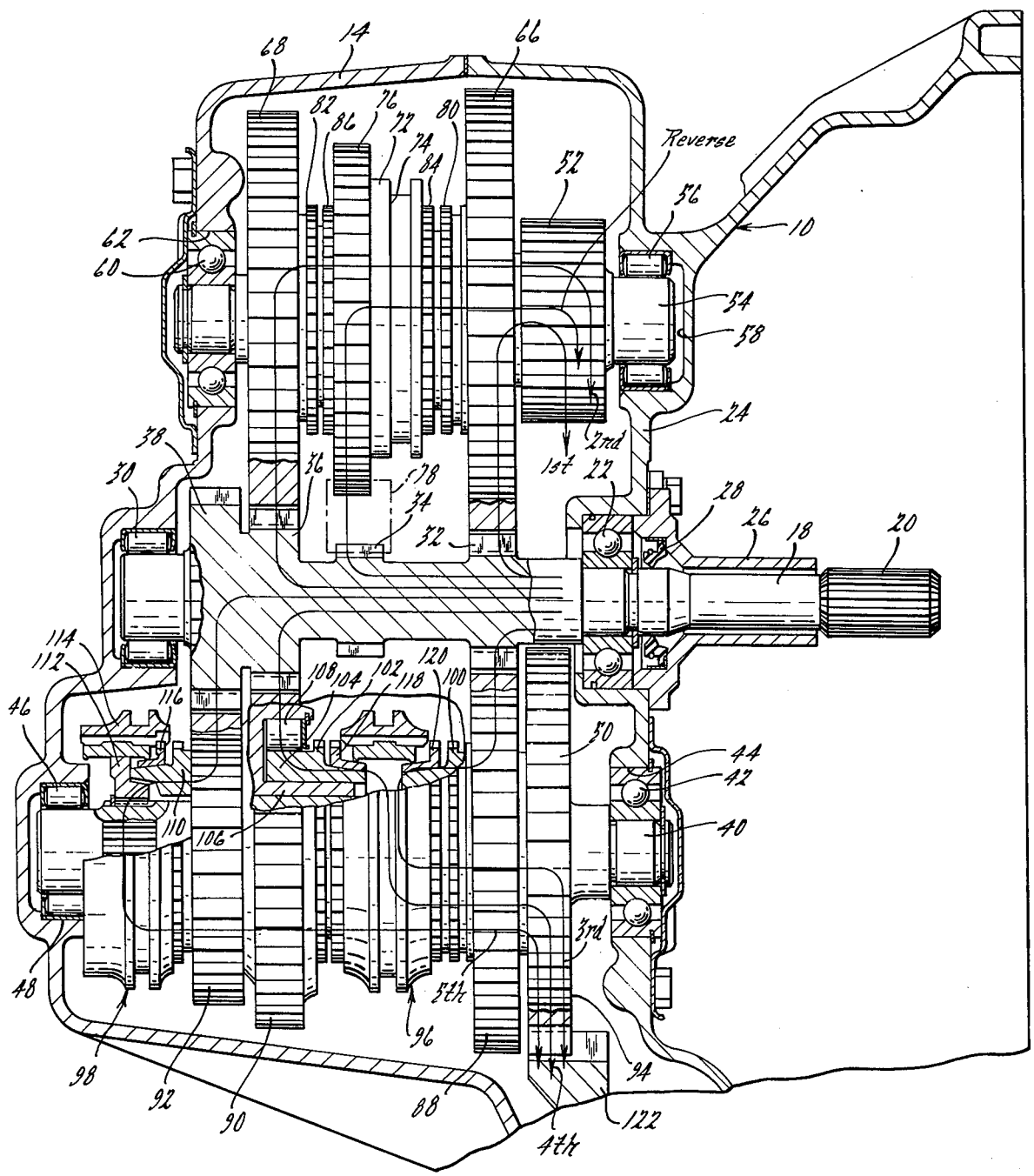
FIG. 1 shows a longitudinal cross sectional view of the gearing system of my improved transmission mechanism.
Figure 1A:
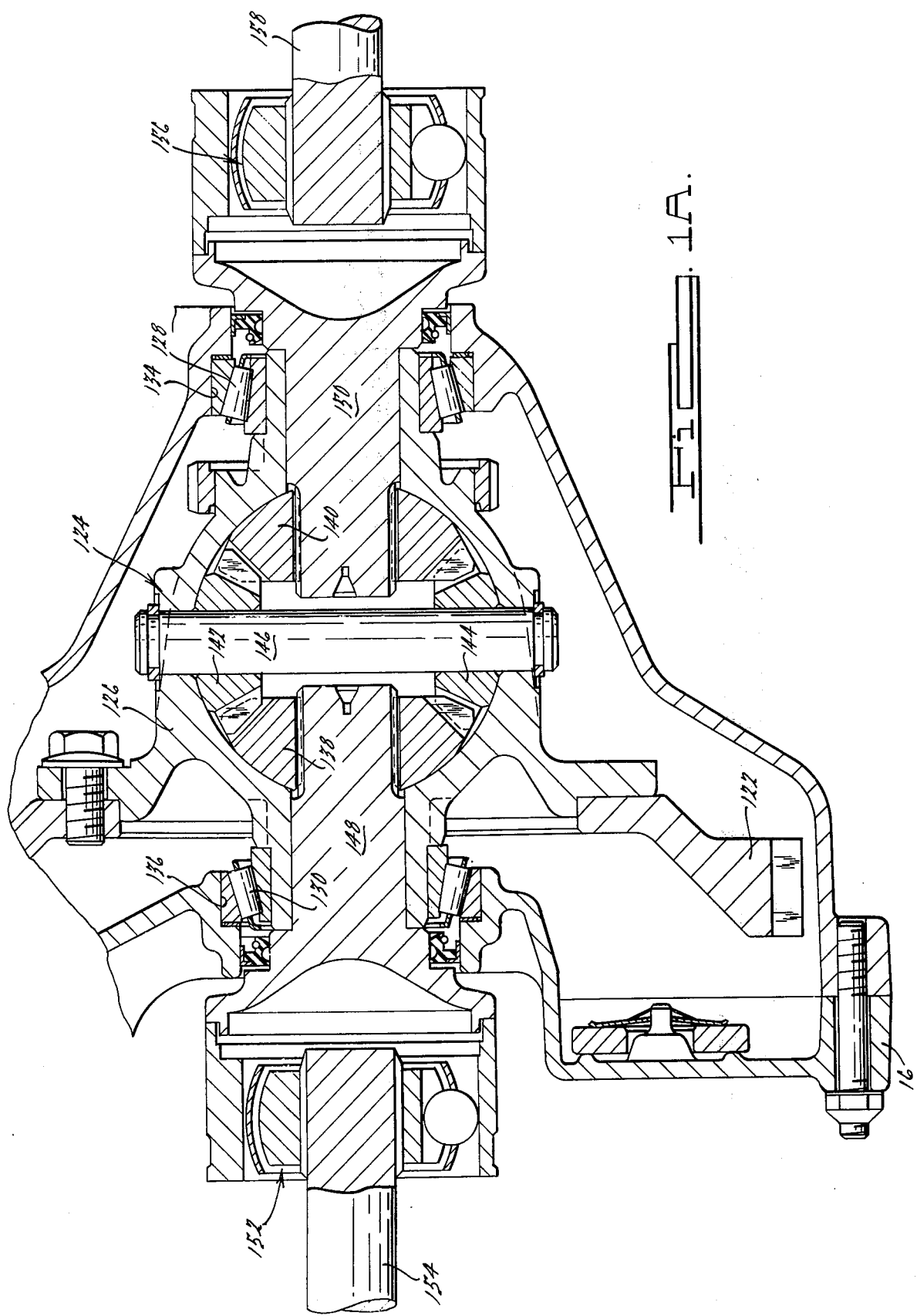
FIG. 1A shows a differential gear mechanism which forms a part of the gear system of FIG. 1 and which is adapted to transfer torque from the torque output gear of FIG. 1 to each of two transversely disposed axial shafts.

Numeral 18 designates a power input shaft for the gear system of FIG. 1 and is formed with a splined end 20 for accommodating the hub of a selectively engageable neutral clutch for the engine. The neutral clutch is adapted to connect the input shaft 18 to the engine crankshaft. Shaft 18 is journalled by bearing 22 in a bearing opening formed in housing wall 24 of the housing 10. Shaft 18 is surrounded by clutch throw-out bearing support sleeve 26, which is bolted to the wall 24. Sleeve 26 also contains a cavity for retaining fluid seal 28. The left-hand end of the shaft 18 is journalled by bearing 30 in a bearing opening formed in the housing 14.

Torque input gears 32, 34, 36 and 38 are formed on the input shaft 18. Gear 32 functions to deliver torque during operation in the first speed ratio and in the third speed ratio. Gear 36 functions to deliver torque during operation in the second and fourth speed ratios. Gear 38 operates to deliver torque during operation in the overdrive or high speed ratio. Gear 34 functions to deliver torque during reverse drive operation.

A first countershaft 40 is journalled by bearing 42 in bearing opening 44 formed in housing wall 24. The opposite end of the shaft 40 is journalled by bearing 46 which is received in bearing opening 48 in the housing 14. Output gear 50 is formed on or is splined to the shaft 40. It is adapted to mesh with gear 52, which is formed on or splined to a second countershaft 54. Bearing 56 journals one end of the countershaft 54 within bearing opening 58 formed in the housing 10. The other end of the shaft 54 is journalled by bearing 60 in bearing opening 62 formed in the housing 14. Countershaft 54 has mounted on it a first speed ratio gear element 66, a second speed ratio gear element 68 and an output gear element 52. Gear elements 66 and 68 rotate on shaft 54 and gear element 52 is connected to or formed integrally with countershaft 54.

Gear elements 66 and 68 are adapted to be selectively connected to the countershaft 54 by synchronizer clutches. These include a synchronizer clutch sleeve 72 which is adapted for sliding motion in an axial direction on a synchronizer clutch hub carried by the countershaft 54. An annular groove 74 formed in the sleeve 72 receives the ends of a shift fork that forms a part of a gearshift mechanism. Reverse gear 76 is formed on or is carried by sleeve 72. When the sleeve 72 is in the neutral position, as shown in FIG. 1, gear 76 is positioned for torque delivery during reverse drive operation. The reverse idler gear 78, which is shown out of position by means of dotted lines in FIG. 1, is adapted to be shifted in an axial direction into and out of engagement with gear 34 and gear element 76. When idler gear 78 is positioned as shown in FIG. 1, a reverse drive torque delivery path is completed between the input shaft and the countershaft 54. During operation in the forward driving ratios the idler gear 78 is shifted out of meshing engagement with gear element 76 and the gear 34.

External synchronizer clutch teeth 80 are carried by the gear element 66 and external synchronizer clutch teeth 82 are carried by the gear element 68. Synchronizer blocker rings 84 and 86 are situated adjacent the synchronizer clutch teeth 80 and 82, respectively. When the synchronizer clutch sleeve 72 is shifted in a right-hand direction as viewed in FIG. 1, internal clutch teeth formed in the sleeve 72 engage teeth 80 thereby locking the gear element 66 to the countershaft 54. When the sleeve 72 is shifted in a left-hand direction, as viewed in FIG. 1, internal clutch teeth formed in the sleeve 72 engage clutch teeth 82 thereby locking gear element 68 to the countershaft 54.

Countershaft 40 has journalled thereon a third speed ratio gear element 88, a fourth speed ratio gear element 90 and an overdrive gear element 92. A synchronizer clutch assembly 96 is adapted to connect selectively the gear element 88 and the gear element 90 to the countershaft 40. Gear element 88 meshes with input gear 32, gear element 90 meshes with input gear 36 and gear element 92, which is used during overdrive operation, meshes with input gear 38. Synchronizer clutch assembly 98 connects selectively the overdrive gear element 92 to the countershaft 40.

Synchronizer clutch assembly 96 includes external clutch teeth 100 formed on gear element 88, synchronizer clutch teeth 102 formed on overrunning clutch inner race 104 which is journalled on hub 106 of gear 90. Overrunning clutch elements 108 form a driving connection between inner race 104 and the gear 90. During operation in the fourth speed ratio the clutch elements 108 are in engagement but during operation in the fifth overdrive ratio the overrunning clutch freewheels.

Gear 92 carries synchronizer clutch teeth 110. Shaft 40 driveably carries synchronizer clutch hub 112 which supports axially moveable clutch sleeve 114. When the sleeve 114 is shifted in a right-hand direction, internal teeth formed in it engage clutch teeth 110 thereby establishing a driving connection between gear 92 and shaft 40.

Synchronizer clutch blocker element 116 is located adjacent the synchronizer clutch element 110. Corresponding synchronizer cone clutch blocker elements 118 and 120 are located adjacent synchronizer clutch teeth 102 and 100, respectively, for the gears 90 and 88. Output gears 52 and 50 engage driveably ring gear 122 formed on differential gear mechanism 124. Ring gear 122 forms a part of the differential gear assembly. It is bolted or otherwise secured to differential housing 126 which is journalled by spaced tapered roller bearings 128 and 130 in a differential housing, which forms a part of transmission housing portions 10 and 14. Bearing opening 134 receives the tapered roller bearing 128 and bearing opening 136 receives the bearing 130. A pair of side gears 138 and 140 located in the housing 126 mesh with differential pinions 142 and 144, which are journalled on pinion shaft 146 which in turn is end supported in the housing 126. Side gear 138 is splined to a first differential output shaft 148 and the side gear 140 is splined to a second differential output shaft 150. A first universal joint 152 connects the outboard end of the shaft 148 to the axle shaft 154 and a corresponding universal joint 156 connects the outboard end of the shaft 150 to axle shaft 158.

To establish first speed ratio operation synchronizer clutch sleeve 74 is shifted in a right-hand direction thereby locking gear element 66 to the countershaft 54. A torque delivery path then is established between the input shaft 18 and the differential output shafts through gear 32, gear element 66, gear element 52, ring gear 122 and finally through the differential mechanism 124. The ratio change from the first speed ratio to the second speed ratio is obtained by shifting the clutch sleeve 74 in a left-hand direction thereby disengaging the gear element 66 from the countershaft 54 and engaging gear element 68 with the countershaft 54. A torque delivery path then is established from input shaft 18 through gear 36, gear element 68, countershaft 54, gear element 52, ring gear 122 and differential gear assembly 124.

To establish third speed ratio operation, the synchronizer clutch sleeve 72 is shifted to the neutral position shown in FIG. 1 and the synchronizer clutch sleeve for the clutch assembly 96 is shifted in a right-hand direction thereby locking the countershaft 40 to the gear 88. A torque delivery path thus is established between the input shaft 18 and the differential output shafts through gear 32, gear element 88, countershaft 40, gear element 50, gear 122 and differential gear assembly 124.

The fourth forward driving speed is obtained by shifting the clutch sleeve for the synchronizer clutch assembly 96 in a left-hand direction thereby disengaging the gear element 88 from the countershaft 40 and engaging inner clutch race 104 with the clutch teeth of synchronizer sleeve. A torque delivery path then is defined by input shaft 18, gear 36, gear element 90, overrunning clutch 108, countershaft 40, gear element 50, gear 122 and the differential gear assembly 124.

An upshift from the fourth speed ratio to an overdrive ratio is achieved by engaging the synchronizer clutch assembly 98. This involves shifting the synchronizer clutch sleeve 114 in a right-hand direction thereby locking clutch element 92 to the countershaft 40. When this occurs the overrunning clutch assembly shown in part at 108 freewheels and an automatic pickup shift from the fourth forward driving ratio to the fifth overdrive ratio is accomplished. A downshift from the overdrive ratio to the fourth driving ratio is achieved merely by disengaging the overdrive synchronizer clutch 98.

A shift from the overdrive ratio to the fourth speed ratio or an upshift from the fourth ratio to the overdrive ratio can be obtained by relieving the driving torque in a vehicle engine employing an internal combustion engine. Such shifts can be accomplished by lifting the accelerator pedal control for the engine carburetor to achieve a so-called "lift-foot" shift thereby temporarily interrupting the torque delivery and allowing the clutches to engage with minimum torque.

By using my twin countershaft transmission design and my strategic arrangement of the synchronizer clutches it is possible to obtain five forward driving ratios including an overdrive ratio with an overall transmission length that is less than conventional four speed transmissions of the same torque capacity used with internal combustion engines in a vehicle driveline. This makes the transmission particularly adaptable for small vehicle drivelines, especially small vehicle drivelines that include a transversely mounted engine.

Having described a preferred embodiment of my invention, what I claim and desire to secure by U.S. Letters Patent is:

1. A power transmission mechanism having multiple speed ratios including an overdrive ratio comprising an input shaft, a pair of countershafts situated in parallel disposition with respect to said input shaft, multiple torque input gears on said input shaft, countershaft gear elements journalled on said countershafts in meshing engagement with said input gears, each countershaft being connected driveably to a countershaft output gear, an output gear assembly connected driveably to said countershaft output gears, synchronizer clutch means for driveably connecting selectively said gear elements with their respective counter shafts, an overdrive gear connected to said input shaft, an overdrive gear element journalled on one of said countershafts, an overdrive clutch means for connecting selectively said overdrive gear element to its associated countershaft, and overrunning clutch means for establishing a one-way driving connection between one of said countershaft gear elements and its associated countershaft whereby an upshift to the overdrive speed ratio may be accomplished while the synchronizer clutch assembly associated with said one countershaft gear element remains engaged.

2. An overdrive manually controlled transmission mechanism comprising a power input shaft, a pair of countershafts mounted on either side of said input shaft, said countershaft having formed thereon multiple forward driving input gear elements including an overdrive gear element, each countershaft having journalled thereon countershaft gear elements, one gear element being driveably engaged with each gear on said input shaft, a countershaft output gear carried by each countershaft, an output gear assembly driveably engaged with said countershaft output gears, synchronizer clutch means for selectively engaging said countershaft gear elements with their associated countershafts to establish selectively a first, a second, a third and a fourth forward driving speed ratio, one of the gear elements of said countershaft gear assemblies engaging said overdrive gear, an overdrive synchronizer clutch means for selectively connecting said overdrive gear element to its associated countershaft, and overrunning clutch means for establishing a one-way driving connection between a gear element for said fourth forward driving speed ratio and its associated power input gear whereby an upshift from the fourth forward driving ratio to the overdrive ratio may be achieved with a pickup shift without disengaging the synchronizer clutch associated with said fourth forward driving ratio.

3. The combination as set forth in claim 2 wherein said output gear assembly comprises a differential gear mechanism having a ring gear engaged with said countershaft output gears, a differential housing carrying said differential ring gear, differential side gears in said housing and axle shafts mounted in said housing in driving relationship with respect to said side gears.

4. The combination as set forth in claim 3 wherein said output gear assembly comprises a differential gear mechanism having a ring gear engaged with said countershaft output gears, a differential housing carrying said differential ring gear, differential side gears in said housing and axle shafts mounted in said housing in driving relationship with respect to said side gears.

* * * * *